(12) United States Patent
Turley et al.

(10) Patent No.: US 7,744,364 B2
(45) Date of Patent: Jun. 29, 2010

(54) EXTRUSION TIP CLEANING ASSEMBLY

(75) Inventors: Patrick W. Turley, Eden Prairie, MN (US); Thomas L. Taatjes, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 309 days.

(21) Appl. No.: 11/820,961

(22) Filed: Jun. 21, 2007

(65) Prior Publication Data
US 2008/0317894 A1 Dec. 25, 2008

(51) Int. Cl.
B28B 17/00 (2006.01)
B28B 1/16 (2006.01)

(52) U.S. Cl. ............ 425/225; 425/375
(58) Field of Classification Search ........... 425/375, 425/225, 226; 264/113, 308
See application file for complete search history.

(56) References Cited

U.S. PATENT DOCUMENTS

| | | | |
|---|---|---|---|
| 3,027,266 A | 3/1962 | Wikne | 106/86 |
| 4,296,517 A * | 10/1981 | Bohler et al. | 15/93.1 |
| 4,640,608 A | 2/1987 | Higaya et al. | 355/15 |
| 5,121,329 A | 6/1992 | Crump | |
| 5,340,433 A | 8/1994 | Crump | |
| 5,503,785 A | 4/1996 | Crump et al. | |
| 5,594,652 A | 1/1997 | Penn et al. | |
| 5,866,058 A | 2/1999 | Batchelder et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,007,318 A | 12/1999 | Russell et al. | |
| 6,022,207 A | 2/2000 | Dahlin et al. | |
| 6,028,410 A | 2/2000 | Leavitt et al. | |
| 6,054,077 A | 4/2000 | Comb et al. | |
| 6,067,480 A | 5/2000 | Stuffle et al. | |
| 6,085,957 A | 7/2000 | Zinniel et al. | |
| 6,175,422 B1 | 1/2001 | Penn et al. | |
| 6,193,923 B1 | 2/2001 | Leyden et al. | |
| 6,238,613 B1 | 5/2001 | Batchelder et al. | |
| 6,270,335 B2 | 8/2001 | Leyden et al. | |
| 6,305,769 B1 | 10/2001 | Thayer et al. | |
| 6,375,874 B1 | 4/2002 | Russell et al. | |
| 6,391,251 B1 | 5/2002 | Keicher et al. | |
| 6,490,496 B1 | 12/2002 | Dacey | |
| 6,508,971 B2 | 1/2003 | Leyden et al. | |
| 6,532,394 B1 | 3/2003 | Earl et al. | |
| 6,572,807 B1 | 6/2003 | Fong | |
| 6,629,011 B1 | 9/2003 | Calderon et al. | |
| 6,722,872 B1 | 4/2004 | Swanson et al. | |

(Continued)

OTHER PUBLICATIONS

International Search Report and Written Opinion of Foreign Application No. PCT/US08/07791, dated Oct. 1, 2008.

*Primary Examiner*—Maria Veronica D Ewald
(74) *Attorney, Agent, or Firm*—Westman, Champlin & Kelly, P.A.

(57) ABSTRACT

A tip cleaning assembly for use with an extrusion head of an extrusion-based layered deposition system, the tip cleaning assembly comprising a support component, a purge ledge assembly mounted on the support component, at least one set block mounted on the support component adjacent the purge ledge assembly, and at least one contact head removably mounted on the first set block, where the at least one contact head is configured to engage at least one extrusion tip of the extrusion head.

17 Claims, 6 Drawing Sheets

U.S. PATENT DOCUMENTS

| | | |
|---|---|---|
| 6,749,414 B1 | 6/2004 | Hanson et al. |
| 6,776,602 B2 | 8/2004 | Swanson et al. |
| 6,907,307 B2 | 6/2005 | Chen et al. |
| 6,936,212 B1 | 8/2005 | Crawford |
| 6,989,115 B2 | 1/2006 | Russell et al. |
| 2003/0076371 A1 | 4/2003 | Fong |

* cited by examiner

EXTRUSION TIP CLEANING ASSEMBLY

BACKGROUND

The present invention relates to extrusion-based layered manufacturing systems for building three-dimensional (3D) objects. In particular, the present invention relates to cleaning assemblies for use with extrusion heads in extrusion-based layered manufacturing systems.

An extrusion-based layered manufacturing system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through an extrusion tip carried by an extrusion head, and is deposited as a sequence of roads on a substrate in an x-y plane. The extruded build material fuses to previously deposited build material, and solidifies upon a drop in temperature. The position of the extrusion head relative to the base is then incremented along a z-axis (perpendicular to the x-y plane), and the process is then repeated to form a 3D object resembling the CAD model.

Movement of the extrusion head with respect to the base is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second nozzle pursuant to the generated geometry during the build process. The support material adheres to the build material during fabrication, and is removable from the completed 3D object when the build process is complete.

During a build process, residual amounts of build and support materials may seep out of the corresponding extrusion tips after the extrusion processes are halted. These residual materials may interfere with subsequent extrusions, and may also potentially clog the extrusion tips. As such, it is desirable to periodically clean the extrusion head with a cleaning assembly to prevent material buildup in the extrusion tips. Current cleaning assemblies typically require precise calibrations during installation to ensure adequate alignment with the extrusion tips of the extrusion head. Such calibrations are time consuming and require skillful technicians. Thus, when portions of a cleaning assembly are damaged and need replacement, the cleaning assembly typically requires recalibration before being operated. This delays the operation of the extrusion-cleaning layered manufacturing system and may increase service costs. Thus, there is a need for a cleaning assembly that is efficient for cleaning extrusion heads, and is easy to repair with reduced recalibration requirements.

SUMMARY

The present invention relates to a tip cleaning assembly for use with an extrusion head of an extrusion-based layered deposition system. The tip cleaning assembly includes a support component, a purge ledge assembly mounted on the support component, a set block mounted on the support component adjacent the purge ledge assembly, and a contact head removably mounted on the first set block. The contact head is configured to engage an extrusion tip of the extrusion head.

DETAILED DESCRIPTION

Figure 1:
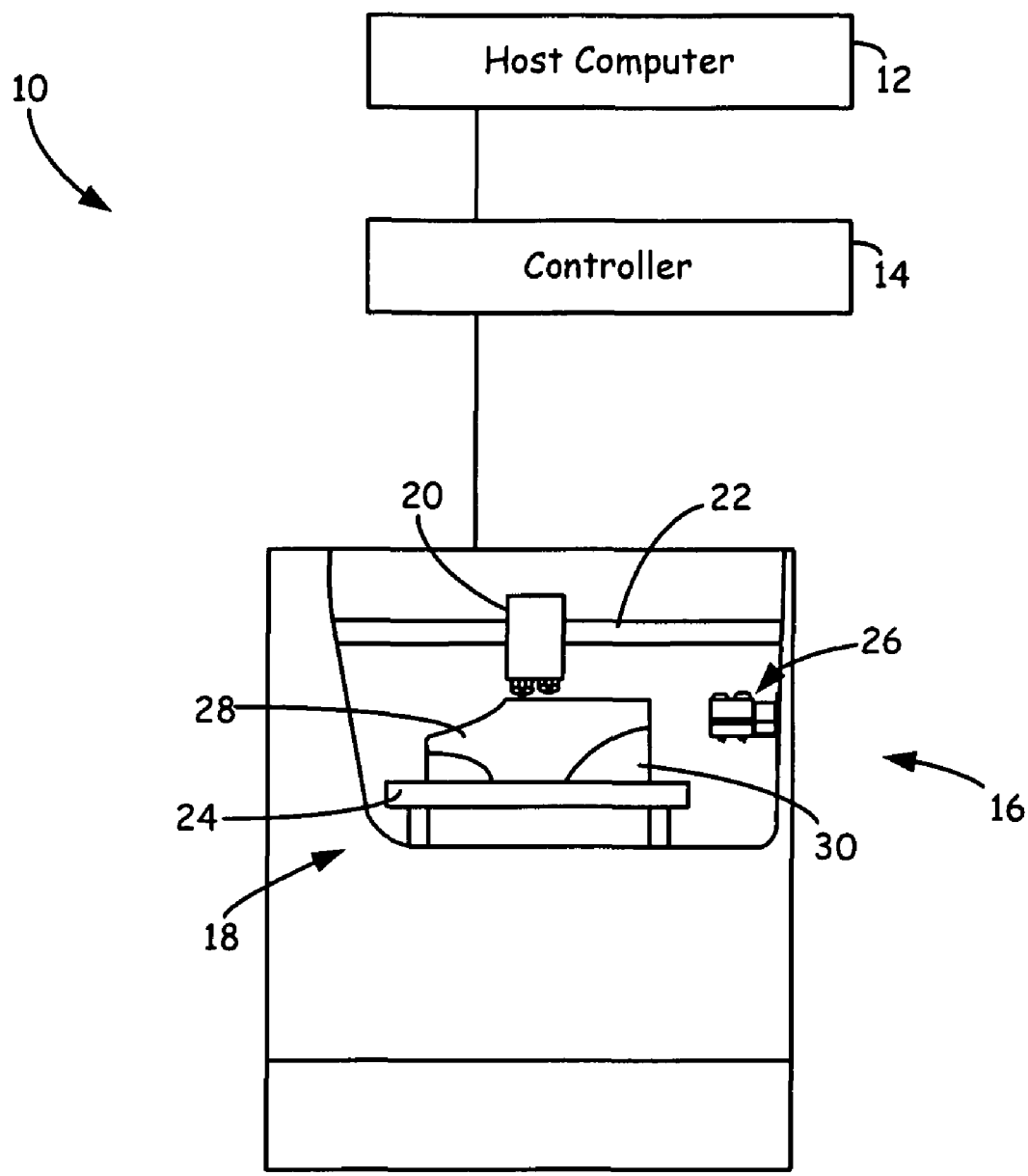
FIG. 1 is a front view of an assembly for building 3D objects, which includes a tip cleaning assembly.

FIG. 1 is a front view of assembly 10 for building 3D objects, which includes host computer 12, controller 14, and extrusion-based layered deposition system 16. Host computer 12 is a computer-based system that interacts with deposition system 16 via controller 14 to build 3D objects and corresponding support structures. Deposition system 16 builds 3D objects with an extrusion-based layered deposition technique. Suitable systems for deposition system 16 include those that deposit roads of build material to build a 3D object (and corresponding support structure) in a layer-by-layer manner, such as fused deposition modeling systems commercially available under the trademark "FDM" from Stratasys, Inc., Eden Prairie, Minn.

Deposition system 16 includes build chamber 18, extrusion head 20, gantry 22, substrate 24, and tip cleaning assembly 26. Build chamber 18 is an enclosed environment for building a 3D object (referred to as 3D object 28) and a corresponding support structure (referred to as support structure 30). Extrusion head 20 is a dual-tip extrusion head supported by gantry 22 for building 3D object 28 and support structure 30 on substrate 24 in a layer-by-layer manner. Gantry 22 is a guide rail system configured to move extrusion head 20 in a horizontal x-y plane within build chamber 18 based on signals provided from controller 14. Substrate 24 is a platform on which 3D object 28 and support structure 30 are built, and moves along a vertical z-axis based on signals provided from controller 14.

Tip cleaning assembly 26 is an apparatus for cleaning extrusion head 20 with a two-step process that includes (1) a purging step and (2) a tip wiping step. As discussed below, tip cleaning assembly 26 is also designed to reduce the number of recalibrations required when replacing damaged components during operation. This reduces the time and effort required to repair tip cleaning assembly 26. Tip cleaning assembly 26 is mounted within build chamber 18 at a location that is that is accessible by extrusion head 20, but is offset from substrate 24. The offset location prevents tip cleaning assembly 26 from interfering with build processes. When extrusion head 20 completes a deposition process, a residual amount of the extruded material may seep out from extrusion head 20. If not removed, this residual material may interfere with subsequent depositions. As such, extrusion head 20 periodically undergoes a cleaning operation with tip cleaning assembly 26. This reduces the risk of interference by the residual build and support materials with subsequent depositions.

In one embodiment, the cleaning operation steps for extrusion head 20 are provided in the build data supplied by host computer 12. For each cleaning operation, the steps involve moving extrusion head 20 in the x-y plane to align with tip cleaning assembly 26, and then performing the purging step and the tip wiping step. The intervals for performing the cleaning operation may vary depending on the build parameters. For example, extrusion head 20 may undergo a cleaning operation when transitioning between build and support materials, and/or after the completion of each layer. Additionally, extrusion head 20 may undergo a purging step or one or more tip wiping steps at periodic intervals to ensure extrusion head 20 is adequately cleaned.

Figure 2:
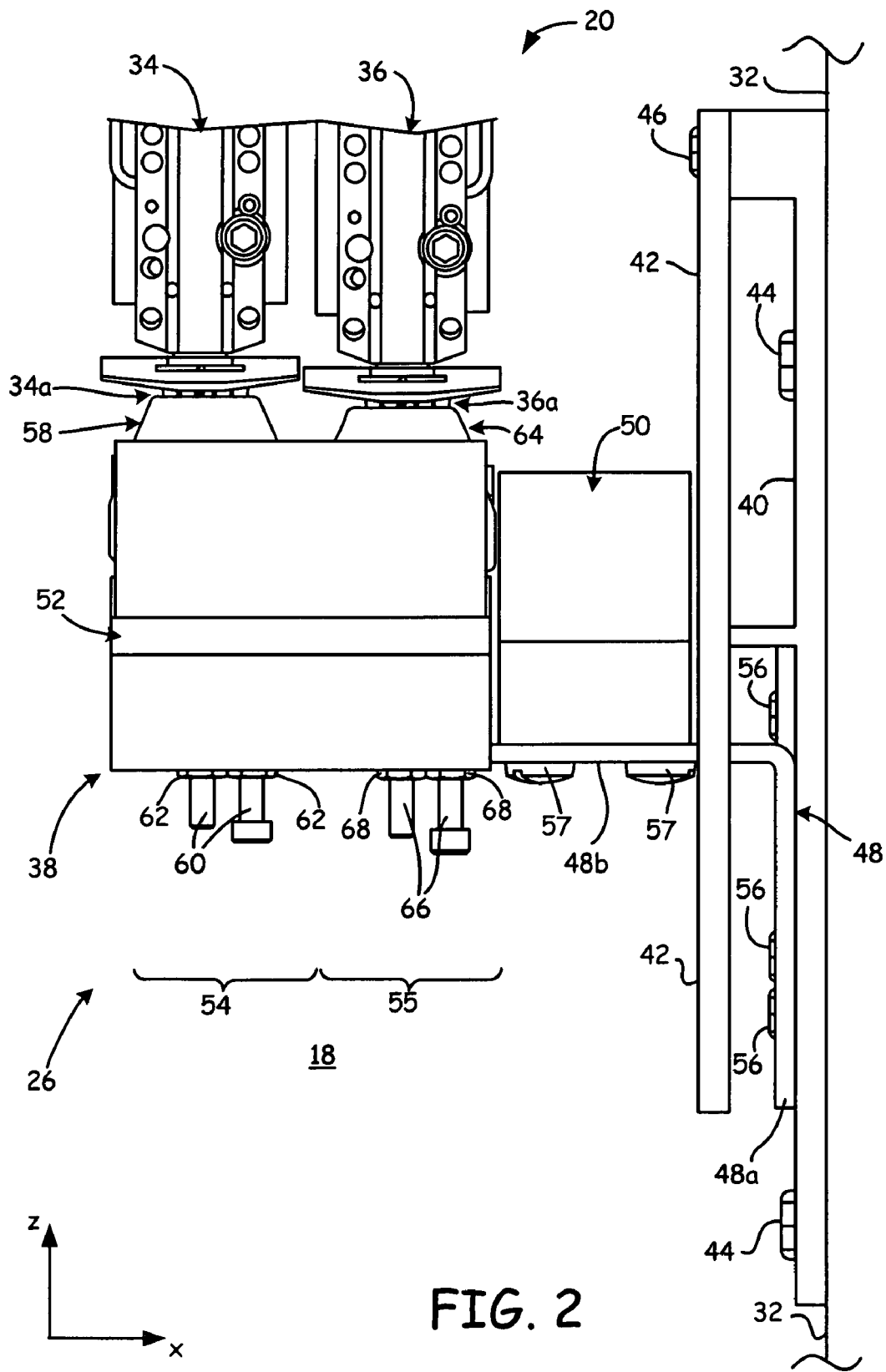
FIG. 2 is an expanded view of an extrusion head engaged with the tip cleaning assembly, within a build chamber of an extrusion-based layered deposition system.

FIG. 2 is an expanded view of extrusion head 20 engaged with tip cleaning assembly 26, within build chamber 18. As shown, build chamber 18 further includes chamber wall 32, which is an interior wall of build chamber 18 that provides a supporting surface for tip cleaning assembly 26. Extrusion head 20 includes build line 34 and support line 36, where build line 34 is a first extrusion pathway configured to liquefy and extrude a build material through build tip 34a. This allows build line 34 to deposit the build material as a series of roads onto substrate 24 (shown in FIG. 1) to build 3D object 28 (shown in FIG. 1) in a layer-by-layer manner. Similarly, support line 36 is a second extrusion pathway configured to liquefy and extrude a support material through support tip 36a, thereby allowing support line 36 to deposit the support material as a series of roads onto substrate 24 to build support structure 30 (shown in FIG. 1) in a layer-by-layer manner.

Extrusion head 20 is configured to toggle support line 36 between raised and lowered positions along the z-axis. When support line 36 is in the lowered position (as shown in FIG. 2), support tip 36a extends lower than build tip 34a by about 1.6 millimeters (about 0.06 inches). This allows support line 36 to extrude roads of support material to build support structure 30 without interference from build tip 34a. Alternatively, when depositing build material, support line 36 is toggled to the raised position, where support tip 36a extends higher than build tip 34a by about 1.6 millimeters (about 0.06 inches). This allows build line 34 to extrude roads of build material to build 3D object 28 without interference from support tip 36a.

Tip cleaning assembly 26 includes primary module 38, support frame 40, and curtain 42, where primary module 38 is the portion of tip cleaning assembly 26 that interacts with build tip 34a and support tip 36a of extrusion head 20. Support frame 40 is secured to chamber wall 32 with bolts 44, and provides a mounting location for securing primary module 38 to chamber wall 12.

Curtain 42 is a barrier secured to support frame 40 with bolt 46, and is disposed adjacent primary module 38 to block the pathways of errant strands of purged materials. This prevents the errant strands from entering air vents (not shown) of build chamber 18, where the materials may otherwise collect and potentially damage deposition system 16. Curtain 42 is desirably formed from one or more materials that are resistant to the elevated temperatures of build chamber 18, and that have low coefficients of friction. Examples of suitable materials for curtain 42 include fluoropolymer materials, such as polytetrafluoroethylenes (PTFEs). An example of a particularly suitable PTFE for curtain 42 includes the PTFE commercially available under the trademark "TEFLON" from E.I. du Pont de Nemours and Company, Wilmington, Del.

Primary module 38 includes retention bracket 48, deflector block 50, purge ledge assembly 52, and wiper assemblies 54 and 55. Retention bracket 48 is an L-shaped bracket that includes wall portion 48a and arm portion 48b extending perpendicular to each other. Wall portion 48a is secured to support frame 26 with nuts 56, which allows arm portion 48b to provide a cantilevered support for deflector block 50, purge ledge assembly 52, and wiper assemblies 54 and 55.

Deflector block 50 is secured to arm portion 48b with screws 57, and, along with curtain 42, provides protection against errant strands of purged materials. Deflector block 50 is also desirably formed from one or more materials that are resistant to the elevated temperatures of build chamber 18, and that have low coefficients of friction. Suitable and particularly suitable materials for deflector block 50 include those discussed above for curtain 42.

Purge ledge assembly 52 is secured to arm portion 48b on the opposing side of deflector block 50 from curtain 42 along the x-axis. As discussed below, purge ledge assembly 52 provides a suitable location for purging build tip 34a and support tip 36a during the purging step of the cleaning operation.

Wiper assemblies 54 and 55 are secured to arm portion 48b behind purge ledge assembly 52 along the y-axis, where the y-axis is perpendicular to the x-z plane. As shown, wiper assembly 54 includes contact head 58, set screws 60, and adjustment nuts 62. Wiper assembly 55 includes contact head 64, set screws 66, and adjustment nuts 68. Contact heads 58 and 64 are the portions of primary module 38 that physically interact with build tip 34a and support tip 36a, respectively. This allows contact heads 58 and 64 to remove excess materials from build tip 34a and support tip 36a during the tip wiping step of the cleaning operation.

Set screws 60 and adjustment nuts 62 allow contact head 58 to be calibrated at a predetermined height along the z-axis that vertically aligns contact head 58 with build tip 34a. Similarly, set screws 66 and adjustment nuts 68 allow contact head 64 to be calibrated at a predetermined height along the z-axis that vertically aligns contact head 64 with support tip 36a. In the embodiment shown in FIG. 2, tip cleaning assembly 26 is configured to interact with extrusion head 20 when support line 36 is toggled to the lowered position. As such, contact head 64 is disposed lower than contact head 58, thereby allowing contact heads 58 and 64 to respectively align with build tip 34a and support tip 36a.

Alternatively, tip cleaning assembly 26 may be calibrated to align contact heads 58 and 64 with a variety of different extrusion head arrangements. For example, tip cleaning assembly 26 may alternatively be calibrated to interact with extrusion head 20 when support line 36 is toggled to the raised position. In this embodiment, contact head 58 is disposed lower than contact head 64. In another alternative embodiment, tip cleaning assembly 26 is calibrated to interact with extrusion head 20 when build tip 34a and support tip 36a are vertically level. In this embodiment, contact heads 58 and 64 are also disposed at equal heights along the z-axis.

Tip cleaning assembly 26 may also include one or more housing components (not shown) that guide the strands of purged materials downward below primary module 38 toward a waste container (not shown). For example, tip cleaning assembly 26 may include a housing component that extends laterally around primary module 38. Along with curtain 42, this housing component restricts the pathways of the purged strands to directions vertically below primary module 38. The housing component(s) prevent errant strands of purged materials from entering undesired locations within build chamber 18 (e.g., air vents).

When installing tip cleaning assembly 26 in build chamber 18, support frame 40 is secured to chamber wall 32 with bolts 44. Wall portion 48a is then secured to support frame 40 with nuts 56, and curtain 42 is inserted onto arm portion 48b and secured to support frame 40 with bolt 46. Set screws 60, adjustment nuts 62, set screws 66, and adjustment nuts 68 are then used to calibrate the heights of contact heads 58 and 64 for vertical alignment with build tip 34a and support tip 36a. Because contact heads 58 and 64 respectively engage build tip 34a and support tip 36a during a cleaning operation, contact heads 58 and 64 may be damaged over the course of multiple cleaning operations. With standard cleaning assemblies, replacement of such parts would typically require a recalibration step. However, as discussed below, once set screws 60 and adjustment nuts 62 are set for the initial calibration of contact head 58, a damaged contact head 58 may be replaced with a new contact head 58 without requiring a recalibration step. The same arrangement applies to contact head 64, set screws 66, and adjustment nuts 68. This reduces the time and effort required to repair tip cleaning assembly 26.

Figure 3:
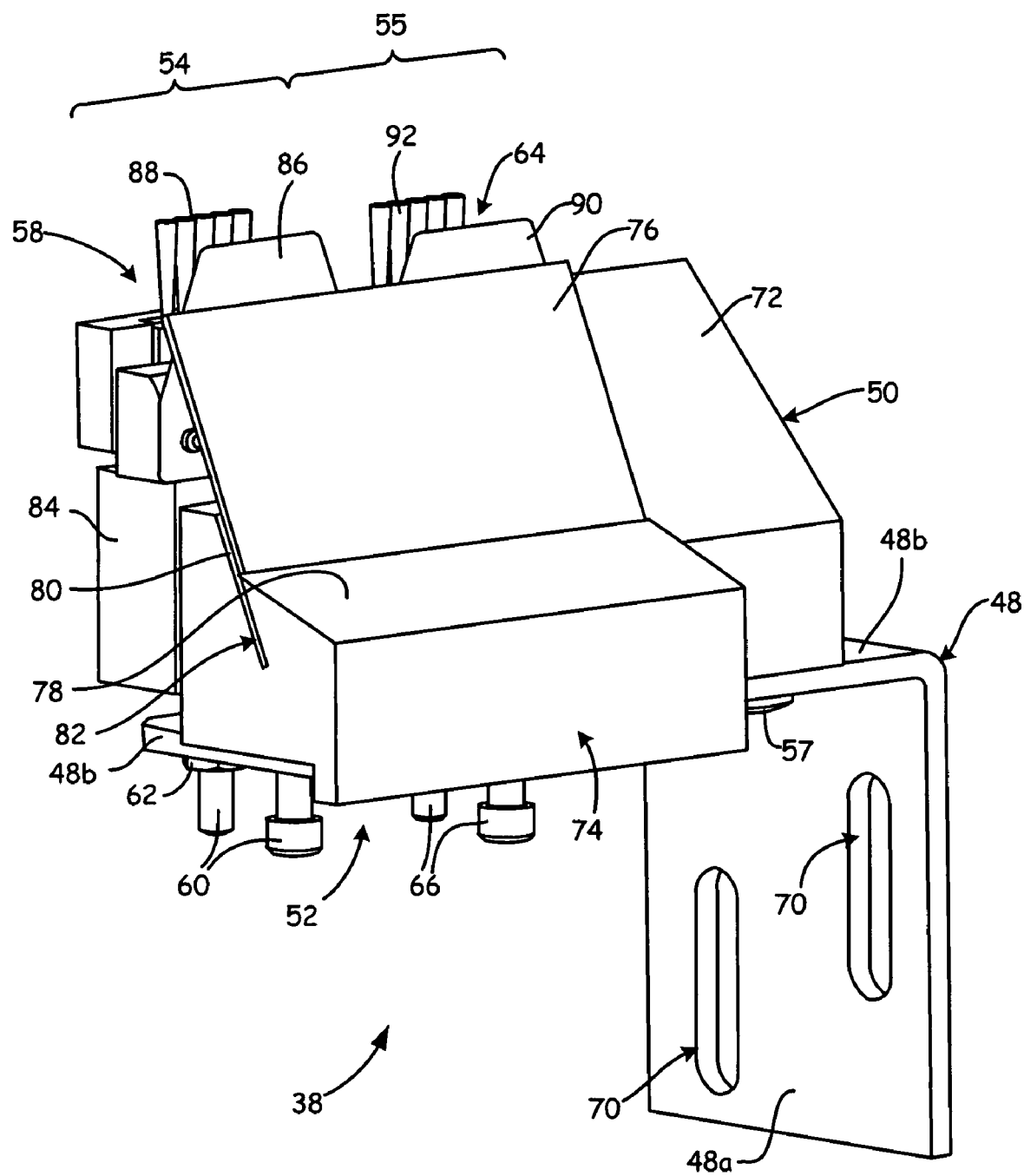
FIG. 3 is a front perspective view of a primary module of the tip cleaning assembly.

FIG. 3 is a front perspective view of primary module 38. As shown, wall portion 48a of retention bracket 48 includes slots 70, which are elongated openings through wall portion 48a for securing wall portion 48a to support frame 40 (shown in FIG. 2) with nuts 56 (shown in FIG. 2). As discussed below, the elongated shapes of slots 70 allow primary module 38 to be adjusted along the z-axis during an initial calibration step.

Deflector block 50 includes angled surface 72 which extends at an angle from the x-y plane to allow strands of purged materials to slide down angled surface 72. Accordingly, deflector block 50 prevents errant strands of purged materials from collecting on arm portion 48b of retention bracket 48. Examples of suitable angles for angled surface 72 relative to the horizontal x-y plane include at least about 30 degrees, with particularly suitable angles relative to the horizontal x-y plane ranging from about 45 degrees to about 60 degrees.

Purge ledge assembly 52 includes base block 74 and extension sheet 76, where base block 74 is the portion of purge ledge assembly 52 that is mounted on arm portion 48b of retention bracket 48. Base block 74 and extension sheet 76 are each desirably formed from one or more materials that are resistant to the elevated temperatures of build chamber 18, and that have low coefficients of friction. Suitable and particularly suitable materials for base block 74 and extension sheet 76 include those discussed above for curtain 42 (shown in FIG. 2).

Base block 74 includes front angled surface 78, rear angled surface 80, and slit 82. Front angled surface 78 is a surface for directly receiving the strands of purged materials from extrusion head 20. Additionally, front angled surface 78 is beneficial for compressing or balling up the strands of purged materials (e.g., in a pretzel shape), thereby reducing this risk of clogs in the chute below primary module 38. As such, front angled surface 78 is desirably disposed at a shallower angle to the horizontal x-y plane relative to angled surface 72 of deflector block 50. Examples of suitable angles for front angled surface 78 relative to the horizontal x-y plane include angles of at least about 15 degrees, with particularly suitable angles relative to the horizontal x-y plane ranging from about 15 degrees to about 25 degrees.

Rear angled surface 80 is disposed at a steeper angle relative to front angled surface 78, and provides a supporting surface for extension sheet 76. Slit 82 is located at the intersection of front angled surface 78 and rear angled surface 80, and extends at the same angle as rear angled surface 80. This allows extension sheet 76 to be inserted within slit 82 and to be supported by rear angled surface 80. Examples of suitable angles for rear angled surface 80 and slit 82 relative to the horizontal x-y plane include angles of at least about 45 degrees, with particularly suitable angles relative to the horizontal x-y plane ranging from about 45 degrees to about 75 degrees, and with even more particularly suitable angles relative to the horizontal x-y plane ranging from about 60 degrees to about 75 degrees.

Extension sheet 76 is secured within slit 82 and provides an additional surface for receiving the purged strands of build and support materials. As shown, extension sheet 76 extends to contact heads 58 and 64. This allows the excess portions of the build and support materials that are removed with contact heads 58 and 64 to slide down extension sheet 76 to front angled surface 78. Extension sheet 76 also reduces the air gap between contact heads 58/64 and base block 74. This is beneficial for reducing the accumulation of strands of purged materials. Without extension sheet 76, large balls of accumulated strands may build up before falling down the chute below primary module 38. Such large balls may potentially clog the chute. However, the use of extension sheet 76 eliminates the main catch point in the purge area, thereby allowing single strands of purged materials to fall down the chute.

Wiper assembly 54 further includes set block 84, which is secured above arm portion 48a with set screws 60 and adjustment bolts 62. Contact head 58 is mounted on set block 84, and includes flicker plate 86 and brush 88, where flicker plate 86 is disposed in front of brush 88 along the y-axis. Similarly, contact head 64 includes flicker plate 90 and brush 92, where flicker plate 90 is disposed in front of brush 92 along the y-axis.

Flicker plates 86 and 90 are each flexible or partially-flexible plates that respectively engage with build tip 34a (shown in FIG. 2) and support tip 36a (shown in FIG. 2) to remove excess materials after a purge operation. Suitable materials for flicker plates 86 and 90 include high-temperature plastics and metals (e.g., stainless steel). Brushes 88 and 92 are flexible brush strands that provide secondary wiping operations for build tip 34a and support tip 36a, respectively. Suitable materials for brushes 88 and 92 include polymeric and metallic brush fibers.

When tip cleaning assembly 26 is calibrated, flicker plates 86 and 90 are respectively aligned to contact build tip 34a and support tip 36a during a cleaning operation. Brushes 88 and 92 extend vertically higher than flicker plates 86 and 90, respectively. This allows brushes 88 and 92 to provide a greater reach for wiping build tip 34a and support tip 36a. However, because they are more flexible than flicker plates 86 and 90, brushes 88 and 92 may provide a greater amount of contact with build tip 34a and support 36a without damaging build tip 34a and support tip 36a. Accordingly, the flicker plate/brush arrangement of contact heads 58 and 64 provide a two-step mechanism for wiping build tip 34a and support tip 36a.

During a cleaning operation, extrusion head 20 is positioned along the x-axis such that build tip 34a is aligned with flicker plate 86 and brush 88 along the y-axis, and such that support tip 36a is aligned with flicker plate 90 and brush 92 along the y-axis. Additionally, extrusion head 20 is positioned along the y-axis such that build tip 34a and support tip 36a are disposed above front angled surface 78 of purge ledge assembly 52. An initial purge operation is then performed, where one or both of build line 34 and build line 36 extrude a predetermined amount of build material from build tip 34a and/or a predetermined amount of support material from support tip 36a. The extruded strands of purged materials deposit onto front angled surface 78, and slide down below primary module 38 into a waste container (not shown). The purge operation cleans out any potential material buildups within build line 34 and support line 36.

When the purge operation is complete, build line 34 and support line 36 respectively stop extruding the build and support materials. Extrusion head 20 then moves rearward along the y-axis, which causes build tip 34a to contact flicker plate 86 and allows support tip 36a to contact flicker plate 90. The contact forces bias flicker plates 86 and 90 rearward and wipe any residual amounts of build and support materials located on build tip 34a and support tip 36a. As extrusion head 20 continues to move rearward along the y-axis, build tip 34a and support tip 36a pass beyond flicker plates 86 and 90, thereby allowing flicker plates 86 and 90 to return to their unbiased positions. Build tip 34a then engages with brush 88 and support tip 36a engages with brush 92. Brushes 88 and 92 provide a second wiping action that removes any remaining amount of build and support materials respectively from build tip 34a and support tip 36a. After the purging and wiping operations, extrusion head 20 may then proceed with a subsequent deposition process.

Over the course of multiple cleaning operations, one or more of flicker plates 86 and 90 and brushes 88 and 92 may be worn or damaged during the engagements with build tip 34a and support tip 36a. For example, flicker plates 86 and 90 may be chipped due to the direct contact with build tip 34a and support tip 36a. Moreover, brushes 88 and 92 may become saturated with build and support materials, thereby gumming up brushes 88 and 92. In such situations, one or both of the damaged contact heads 58 and 64 may be replaced with a new contact head without requiring a recalibration of primary module 38. As discussed above, this reduces the time and effort required to repair tip cleaning assembly 26.

Figure 4:
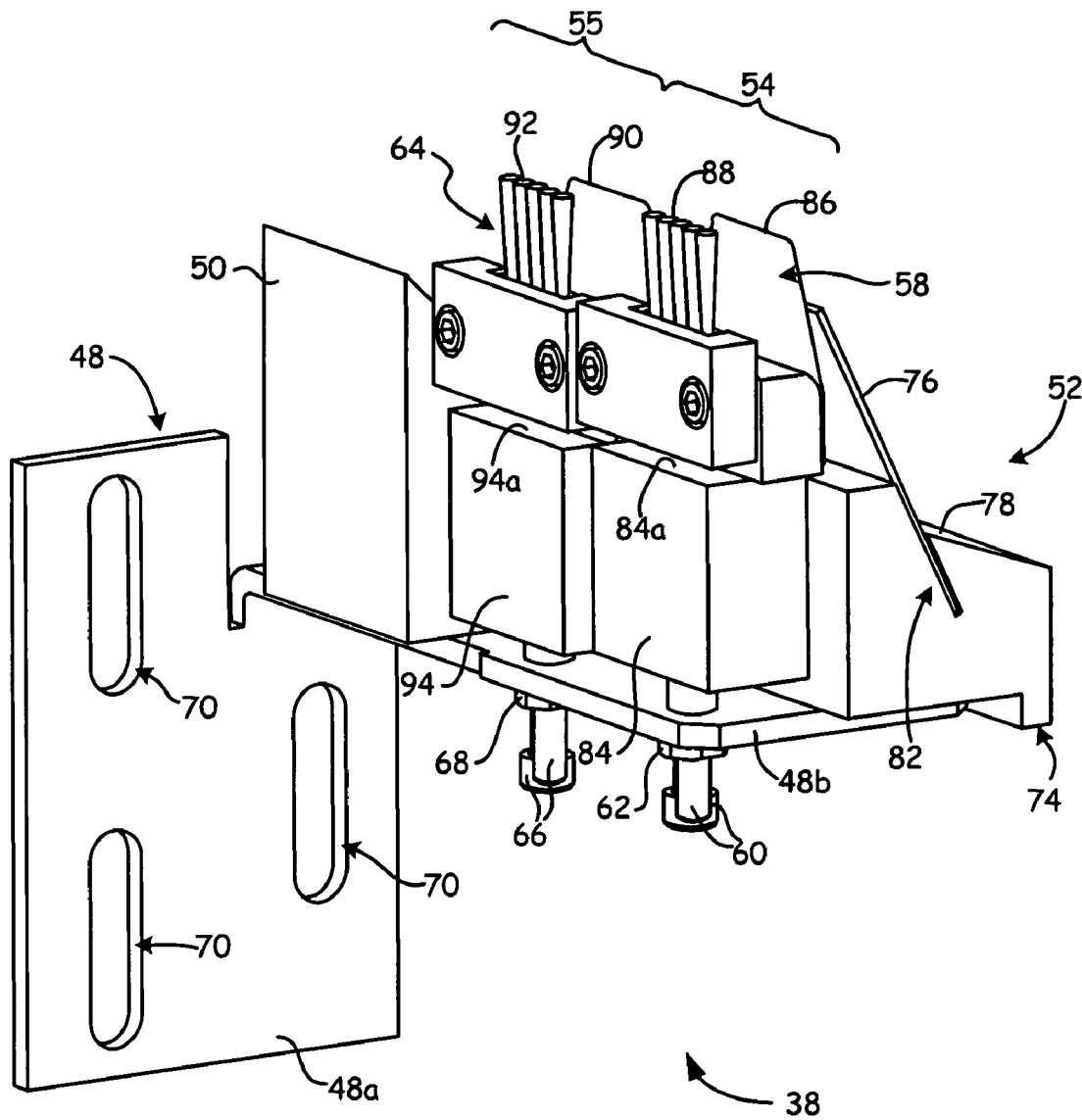
FIG. 4 is a rear perspective view of the primary module.

FIG. 4 is a rear perspective view of primary module 38, which illustrates the mechanisms for calibrating wiper assemblies 54 and 55. As shown, wiper assembly 55 further includes set block 94, which is secured above arm portion 48a with set screws 66 and adjustment nuts 68. Set blocks 84 and 94 respectively include top surfaces 84a and 94a, where contact head 58 is disposed on top surface 84a and contact head 64 is disposed on top surface 94a.

When installing primary module 38, deflector block 50 is secured to arm portion 48b with screws 57 (shown in FIGS. 2 and 3). Set screws 60 and 66 are then inserted through the bottom of arm portion 48b, and set blocks 84 and 94 are inserted onto set screws 60 and 66, respectively. Set screws 60 and 66 are then lowered until set blocks 84 and 94 are flush with arm portion 48b. Nuts 56 (shown in FIG. 2) are then inserted through slots 70 of wall portion 48a, and the vertical position of primary module 38 is adjusted until top surface 84a of set block 84 is located at an initial distance below the height of build tip 34a (shown in FIG. 2). Examples of suitable initial distances range from about 28 millimeters (about 1.1 inches) to about 30 millimeters (about 1.2 inches) below build tip 34a. Nuts 56 are then tightened to secure primary module 38 to support frame 40 (shown in FIG. 2) at the given height. Curtain 42 (shown in FIG. 2) is then inserted onto arm portion 48b and secured to support frame 40 with bolt 46 (shown in FIG. 2).

Set screws 60 are then raised, thereby raising set block 84 with greater precision, until top surface 84a of set block 84 is positioned at a final calibrated distance below build tip 34a. This final calibrated distance aligns contact head 58 with build tip 34a such that flicker plate 86 is capable of contacting build tip 34a. Adjustment nuts 62 are then tightened to secure set screws 60 to arm portion 48b, thereby retaining set block 84 at an offset location above arm portion 48b.

Wiper assembly 55 may then be calibrated in the same manner. Set screws 66 are raised until top surface 94a of set block 94 is positioned at a final calibrated distance below support tip 36a. As discussed above, support tip 36a extends lower than build tip 34a. As such, in this embodiment, the top surface 94a is located at a lower elevation than top surface 84a. The final calibrated distance accordingly aligns contact head 64 with support tip 36a such that flicker plate 90 is capable of contacting support tip 36a. Adjustment nuts 68 are then tightened to secure set screws 68 to arm portion 48b, thereby retaining set block 94 at an offset location above arm portion 48b. Contact heads 58 and 64 may then be mounted onto set blocks 84 and 94 for use in cleaning operations.

Figure 5:
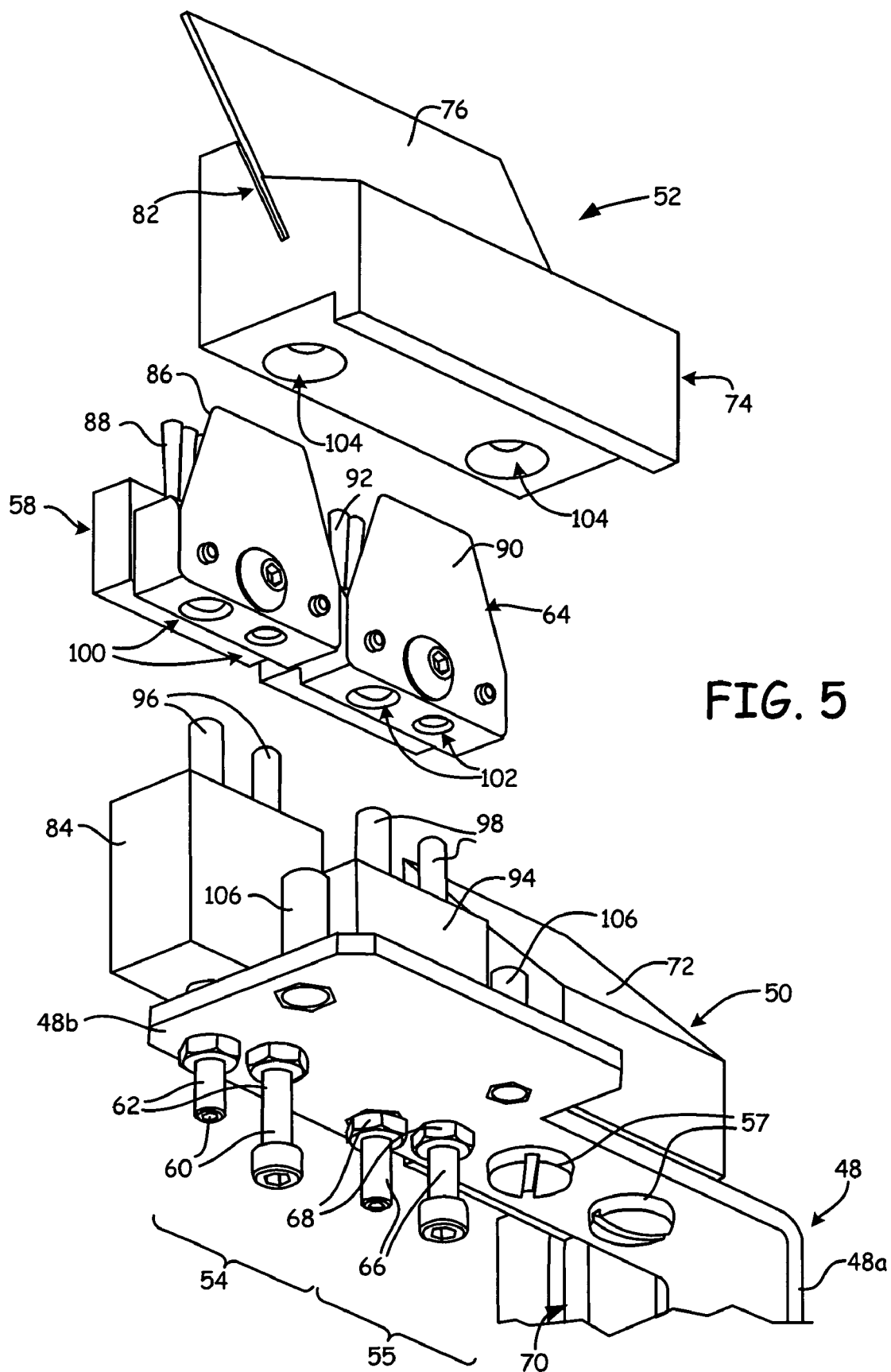
FIG. 5 is an exploded perspective view of the primary module.

FIG. 5 is a bottom exploded view of primary module 38, further illustrating the engagements between contact heads 58 and 64 and set blocks 84 and 94. As shown, set blocks 84 and 94 respectively include dowels 96 and 98, and contact heads 58 and 64 respectively include bottom openings 100 and 102. After set blocks 84 and 94 are secured at the desired offset locations above arm portion 48b, contact head 58 is mounted on set block 84 by lowering contact head 58 onto dowels 96, which causes dowels 96 to insert into bottom openings 100 of contact head 58 as contact head 58 is lowered. Correspondingly, contact head 64 is mounted on set block 94 by lowering contact head 64 onto dowels 98, which causes dowels 98 to insert into bottom openings 102 of contact head 64 as contact head 64 is lowered. Because the heights of set blocks 84 and 94 along the z-axis were calibrated at the desired locations, contact head 58 is vertically aligned along the z-axis with build tip 34a (shown in FIG. 2) and contact head 64 is vertically aligned along the z-axis with support tip 36a (shown in FIG. 2).

The diameters of dowels 96 and bottom openings 100 desirably provide a suitable amount of friction to prevent contact head 58 from being dislodged from set block 84 during a cleaning operation, while also allowing contact head 58 to be removed from set block 84 without an undue amount of removal force. The diameters of dowels 98 and bottom openings 102 desirably provide a similar arrangement for contact head 64. As a result, contact heads 58 and 64 are removably mounted on set blocks 84 and 94. This allows contact heads 58 and 64 to be readily removed from dowels 96 and 98 when damaged, and interchangeably replaced with undamaged contact heads 58 and 64. Because set blocks 84 and 94 are precalibrated at the desired heights along the z-axis, additional adjustments are not required for the new contact heads 58 and 64 to be vertically aligned along the z-axis with build tip 34a and support tip 36a. Accordingly, wiper assemblies 55 and 58 allow easy replacement and installation of damaged components.

In one embodiment, each dowel of dowels 96 have different diameters, and each opening of bottom openings 100 have a corresponding diameter, thereby ensuring that contact head 58 may only be mounted on set block 84 in a single direction. This reduces the risk of mounting contact head 58 onto set block 84 backwards. Similarly, in one embodiment, each dowel of dowels 98 have different diameters, and each opening of bottom openings 102 have a corresponding diameter, thereby ensuring that contact head 64 may only be mounted on set block 94 in a single direction. This reduces the risk of mounting contact head 64 onto set block 94 backwards.

As further shown in FIG. 5, base block 74 of purge ledge assembly 52 further includes bottom openings 104, and arm portion 48b includes pins 106. Thus, purge ledge assembly 52 is mounted on arm portion 48b by inserting pins 106 into bottom openings 104. In one embodiment, purge ledge assembly 52 is removably mounted on arm portion 48b, thereby allowing purge ledge assembly 52 to be interchangeably replaced with different purge ledge assemblies 52. This embodiment is beneficial for providing purge ledge assemblies having a variety of different angled surfaces.

While tip cleaning assembly 26 is described above as having two wiper assemblies (i.e., wiper assemblies 54 and 55), tip cleaning assemblies of the present invention may alternatively include a single wiper assembly (for use with a single-tip extrusion head), or three or more wiper assemblies (for use with extrusion heads having three or more extrusion tips). Each wiper assembly may be independently calibrated to vertically align with the corresponding extrusion tip, and may include removable contact heads (e.g., contact heads 58 and 64) that are interchangeable without requiring recalibration steps.

Figure 6:
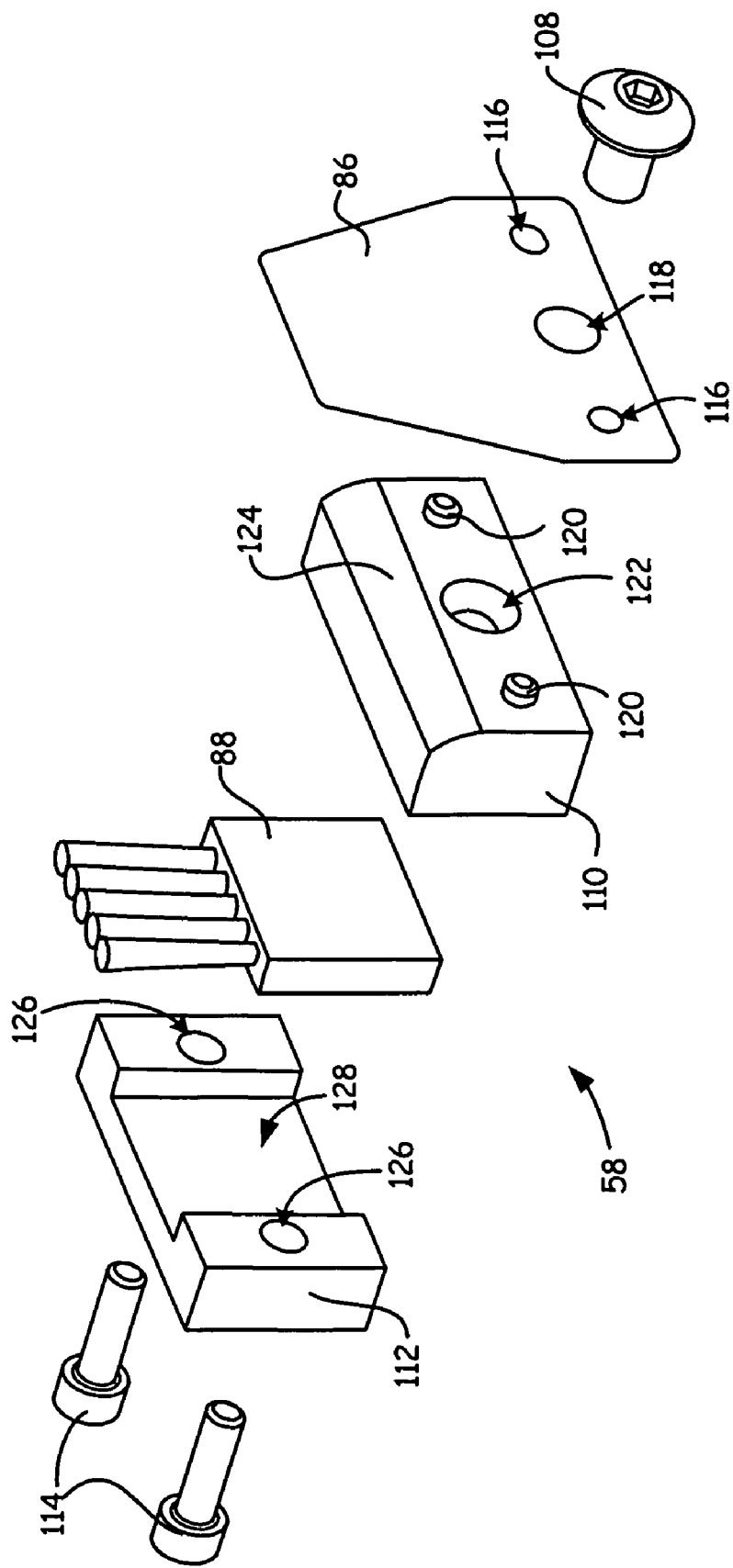
FIG. 6 is an exploded perspective view of a contact head of the primary module.

FIG. 6 is an exploded view of contact head 58, which further includes plate bolt 108, front block 110, rear block 112, and rear bolts 114. As shown, flicker plate 86 includes alignment bores 116 and central bore 118, front block 110 includes tab members 120, central bore 122, and curved shoulder 124, and rear block 112 includes lateral bores 126 and central cavity 128. Front block 110 is the portion of contact head 58 that includes bottom openings 100 (shown in FIG. 5).

Contact head 58 is assembled by encasing brush 88 between front block 110 and rear block 112, such that brush 88 rests in central cavity 128 of rear block 112. An adhesive may also be used to secure brush 88 in central cavity 128. Rear bolts 114 are then inserted through bores 126 and into corresponding bores of front block 110 (not shown). This secures brush 88 between front block 110 and rear block 112. Flicker plate 86 is then mounted on front block 110 such that tab members 120 extend through alignment bores 116. Plate bolt 108 is then inserted through central bores 118 and 122 to secure flicker plate 86 to front block 110. Curved shoulder 124 accordingly allows flicker plate 86 to flex under the biasing force of build tip 34a (shown in FIG. 2) during a cleaning operation.

Once assembled, contact head 58 may be inserted on set block 84 (shown in FIG. 5). In one embodiment, contact head 64 (shown in FIG. 5) is identical to contact head 58, and may be assembled in the same manner. Accordingly, contact heads 58 and 64 are interchangeable with additional contact heads when damaged without requiring recalibration steps. This reduces time and effort required to repair tip cleaning assembly 26, thereby increasing efficiencies during a build process. In an alternative embodiment, one or more of the contact heads (e.g., contact heads 58 and 64) are different, and are designed to optimize the tip wiping step based on the type of material being deposited. For example, the height of flicker plate 86 and the flexibility of brush 88 may vary depending on the viscosity of the material being deposited. However, because set block 84 is already calibrated, when switching between materials, the current contact head merely needs to be removed and interchanged with the desired contact head for use with the new material.

Although the present invention has been described with reference to preferred embodiments, workers skilled in the art will recognize that changes may be made in form and detail without departing from the spirit and scope of the invention.

The invention claimed is:

1. A tip cleaning assembly for use with an extrusion head of an extrusion-based layered deposition system, the tip cleaning assembly comprising:
    a support component configured to be mounted in a build chamber of the extrusion-based layered deposition system;
    a purge ledge assembly mounted on the support component, wherein the purge ledge assembly comprises:
        a first surface configured to extend at a first angle relative to a horizontal plane when the support component is mounted in the build chamber; and
        a second surface configured to extend at a second angle relative to the horizontal plane when the support component is mounted in the build chamber, the second angle being shallower than the first angle;
    at least one set block adjustably mountable onto the support component adjacent the purge ledge assembly;
    at least one mechanism configured to adjust a height of the at least one set block relative to the support component and to fixedly retain the at least one set block at an adjusted height in the build chamber when the support component is mounted in the build chamber; and
    at least one contact head removably mountable onto the at least one set block, the at least one contact head being configured to engage at least one extrusion tip of the extrusion head.

2. The tip cleaning assembly of claim 1, further comprising a deflector block mountable on the support component adjacent the purge ledge assembly and the at least one set block.

3. The tip cleaning assembly of claim 1, wherein the at least one mechanism configured to adjust the height of the at least one set block relative to the support component and to fixedly retain the at least one set block at the adjusted height in the build chamber comprises at least one set screw.

4. The tip cleaning assembly of claim 1, wherein the at least one contact head comprises a plate configured to bias under contact force of the extrusion tip.

5. The tip cleaning assembly of claim 4, wherein the at least one contact head further comprises a brush disposed adjacent the plate.

6. A tip cleaning assembly for use with an extrusion head of an extrusion-based layered deposition system, the tip cleaning assembly comprising:
    a support component configured to be mounted in a build chamber of the extrusion-based layered deposition system;
    a purge ledge assembly mounted on the support component;
    a first set block adjustably mountable onto the support component adjacent the purge ledge assembly;
    a second set block adjustably mountable onto the support component adjacent the purge ledge assembly and the first set block;
    a first mechanism configured to adjust a height of the first set block relative to the support component and to fixedly retain the first set block at a first adjusted height in the build chamber when the support component is mounted in the build chamber;
    a second mechanism configured to adjust a height of the second set block relative to the support component independently of the height adjustment to the first set block, and to fixedly retain the first set block at a second adjusted height in the build chamber when the support component is mounted in the build chamber;
    a first contact head removably mountable onto the first set block; and
    a second contact head removably mountable onto the second set block.

7. The tip cleaning assembly of claim 6, wherein the first adjusted height positions the first contact head at a different height in the build chamber compared to a height at which the second adjusted height positions the second contact head.

8. The tip cleaning assembly of claim 6, wherein the first contact head comprises a first plate configured to bias under contact force of a first extrusion tip of the extrusion head, and a first brush disposed adjacent the first plate.

9. The tip cleaning assembly of claim 8, wherein the second contact head comprises a second plate configured to bias under contact force of a second extrusion tip of the extrusion head, and a second brush disposed adjacent the second plate.

10. The tip cleaning assembly of claim 6, wherein the purge ledge assembly comprises a surface configured to extend at an angle relative to a horizontal plane when the support component is mounted in the build chamber.

11. The tip cleaning assembly of claim 6, further comprising a deflector block mounted on the support component adjacent the purge ledge assembly and the first set block.

12. A tip cleaning assembly for use with an extrusion head of an extrusion-based layered deposition system, the tip cleaning assembly comprising:
 a support component configured to be mounted in a build chamber of the extrusion-based layered deposition system;
 a first surface operably mounted to the support component and configured to extend at a first angle relative to a horizontal plane when the support component is mounted in the build chamber, the first surface further being configured to receive extruded material from the extrusion head during a purge operation;
 a second surface configured to extend at a second angle relative to the horizontal plane when the support component is mounted in the build chamber, the second angle being shallower than the first angle, wherein the second surface is further configured to receive extruded material from the extrusion head during the purge operation;
 at least one set block mounted on the support component adjacent the first surface and the second surface; and
 at least one contact head removably mountable onto the at least one set block, the at least one contact head being configured to engage at least one extrusion tip of the extrusion head.

13. The tip cleaning assembly of claim 12, further comprising at least one set screw configured to adjust the height of the at least one set block relative to the support component and to fixedly retain the at least one set block at the adjusted height in the build chamber when the support component is mounted in the build chamber.

14. The tip cleaning assembly of claim 12, further comprising a deflector block mountable on the support component adjacent the purge ledge assembly and the at least one set block.

15. The tip cleaning assembly of claim 12, wherein the at least one set block comprises a first set block and a second set block, and wherein the at least one contact head comprises a first contact head removably mountable onto the first set block and a second contact head removably mountable onto the second set block.

16. The tip cleaning assembly of claim 12, wherein the at least one contact head comprises a plate configured to bias under contact force of the extrusion tip.

17. The tip cleaning assembly of claim 16, wherein the at least one contact head further comprises a brush disposed adjacent the plate.

\* \* \* \* \*